(12) United States Patent
Hopkins et al.

(10) Patent No.: US 7,758,256 B2
(45) Date of Patent: Jul. 20, 2010

(54) CONNECTOR FOR TIGHT-JACKETED OPTICAL FIBER CABLE

(75) Inventors: Eric James Hopkins, Liverpool, PA (US); Douglas Harold Rohde, York, PA (US); David Donald Erdman, Hummelstown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 12/240,171

(22) Filed: Sep. 29, 2008

(65) Prior Publication Data

US 2010/0080515 A1 Apr. 1, 2010

(51) Int. Cl.
*G02B 6/36* (2006.01)
(52) U.S. Cl. .............................. 385/78; 385/81; 385/76; 385/60; 385/62
(58) Field of Classification Search .................. None
See application file for complete search history.

(56) References Cited

U.S. PATENT DOCUMENTS

| | | | |
|---|---|---|---|
| 5,394,497 A * | 2/1995 | Erdman et al. | ................ 385/78 |
| 7,331,719 B2 | 2/2008 | Manning et al. | |
| 2006/0002662 A1 | 1/2006 | Manning et al. | |
| 2007/0127873 A1 * | 6/2007 | Manning et al. | ............... 385/81 |
| 2007/0292084 A1 | 12/2007 | Gurreri | |
| 2009/0060430 A1 * | 3/2009 | Reed et al. | ................. 385/107 |

* cited by examiner

*Primary Examiner*—Uyen-Chau N Le
*Assistant Examiner*—Chad H Smith

(57) ABSTRACT

A field-installable optical connector for terminating an optical cable, said connector comprising: (a) a housing having a front and back orientation; (b) a rear body attached to the back of said connector housing; (c) a ferrule assembly disposed in said connector housing, said ferrule assembly comprising at least a ferrule adapted for receiving a fiber of said cable, and a clamping mechanism to the rear of said ferrule, said clamping mechanism comprising at least a platform defining a fiber-receiving channel for receiving said fiber, a first member adjacent to the fiber-receiving channel and having at least one cam surface, and a second member having a second cam surface, said first and second cam surfaces cooperating such that relative movement between said first and second members causes said first member to move toward said fiber-receiving channel; (d) an actuator operatively connected to said second member to cause said second member to move relative said first member upon axial movement of said actuator, said actuator having an exposed portion extending rearward from said rear body, said exposed portion adapted to be inserted within a jacket of said cable to secure said jacket to said exposed portion, wherein said actuator and said ferrule assembly move as one unit once said clamping mechanism is actuated by said actuator to secure said fiber therein; and (e) a resilient member disposed between said ferrule and said rear body to urge said ferrule assembly forward.

11 Claims, 6 Drawing Sheets

CONNECTOR FOR TIGHT-JACKETED OPTICAL FIBER CABLE

FIELD OF INVENTION

The present invention relates generally to an optical connector and, more specifically, to a connector suitable for termination to a jacketed optical fiber cable.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to optically couple a fiber with the mating device (e.g., another fiber, an active device or a passive device) by holding the end of the fiber, typically in a ferrule, such that the core of the fiber is axially aligned with the optical pathway of the mating device.

The operation of fiber optical connectors may be classified as either pull-proof or non pull-proof. Referring to FIG. 4, a pull-proof connector 401 and a non pull-proof connector 402 are shown. These particular connectors are SC type connectors, which is a common and well known optical connector type. Each connector is configured to terminate an optical cable. An optical cable comprises an optical fiber, a jacket covering the fiber, and possibly strength members (aramide fibers) between the fiber and the jacket.

With respect to the pull-proof connector 401, when a cable is terminated to it, the cable's jacket (and its strength members, if any) is secured to the rear body 405 of the connector, which, in turn, is attached to the housing 406. Accordingly, if a tensile load T is applied to the cable, the load will be transferred from the cable's jacket, to the rear body 405, and then to the housing 406. The load is therefore not transferred to the ferrule assembly 403. Accordingly, when the connector is mated, the ferrule assembly will not be affected (i.e., drawn back) by the tensile load, and thus the ferrule end face 403a will continue to make contact with the optical pathway of the mating device.

With respect to the non pull-proof connector 402, when a cable is terminated to it, the cable jacket is secured to the rear portion 407 of the ferrule assembly. Unlike the rear body 405, the rear portion 407 is not anchored to the housing 406, but rather is essentially integral with the ferrule assembly. Accordingly, when a tensile load T is applied to the cable, the load on the jacket is transferred to the rear portion 407 and directly to the ferrule assembly 404. This causes the ferrule end face 404a to separate from the mating device, thereby disrupting the optical coupling.

Therefore, a pull-proof connector continues to maintain optical connection at ferrule end face 403a when a tensile load is applied to the cable, while a non pull-proof connector will allow the ferrule end face 404a to separate from the optical coupling when a tensile load is applied to the cable. For this reason, pull-proof connectors are preferred over non pull-proof connectors in ordinary applications.

Although pull-proof connectors are generally preferred, Applicants have discovered that variations in cable types in the field can undermine the benefit of a pull-proof connector. Specifically, the standard LC-type and SC-type pull-proof connectors are designed to terminate loose construction cable where the buffer optical fiber is free to move inside the outer cable jacket. Specifically, referring back to FIG. 4, in a pull-proof connector, when a mating force is applied to the ferrule end face 403a, the ferrule assembly 403 moves backward, causing the buffered fiber to move backward relative to the jacket which, as mentioned above, is anchored to rear body 405.

This mechanism becomes problematic, however, for tight-jacketed cables. A tight-jacketed cable does not allow the optical fiber to move independently of the jacket. Consequently, when a mating force M is applied to ferrule end face 403a, the ferrule assembly 403 moves backward despite the jacket being anchored to the rear body 405. Because the fiber cannot move back within the jacket, the fiber is compressed between the ferrule end face 403a and the rear body 405.

Referring to FIG. 5, an LC connector is shown terminating a tight-jacketed cable. As the connector is mated to the adapter 502, a mating force is imparted on the connector's ferrule end face (not shown), which compresses the fiber as mentioned above and causes a micro bend 503 in the fiber. Such micro bends are known to diminish connector performance or fracture the fiber. Therefore, pull-proof connectors can have a detrimental effect if used to terminate tight-jacketed cables.

The impact of different cables on basic connector function highlights the importance of compatibility during system design. Unfortunately, Applicants have observed that there is a general lack of control over the type of cables being used in optical networks. Indeed, tight-jacketed cable is often used on site without the installer's knowledge of detrimental effects. As the use of tight-jacket cable becomes more prevalent, the lack of industry standards coupled with user ignorance will increase the occurrence of incompatibility between the cable and the connector. Micro bend failures, fiber breakage, and the list of long term reliability issues are the resulting outcome.

Because the occurrence of tight-jacketed cable in the field is often difficult to predict and control, there is a need for flexibility in connector choices in the field. Specifically, technicians need to be able to install either a pull-proof field installable connector or a non pull-proof connector in the field depending upon the cable available. The present invention fulfills this need among others.

SUMMARY OF INVENTION

The present invention provides a field-installable optical connector for tight-jacketed optical cables. To this end, the present invention exploits a known, axially-actuated, fiber clamping mechanism by using the clamping mechanism's actuator as a purchase point for the cable jacket with just a slight modification to the mechanism and the associated connector. More specifically, the actuator or actuator of the clamping mechanism is modified to extend rearward beyond the back of the connector such that it is readily accessible for securing to the cable jacket. This way, the actuator is synergistically used not only for actuating the clamping mechanism, but also for connecting to the jacket. Because the actuator is integral to the clamping mechanism and because the clamping mechanism is integral to the ferrule, when the ferrule is forced rearward during mating, so is the actuator to which the jacket is attached, thereby ensuring that the cable jacket and fiber move as one unit. Consequently, when a fiber is terminated in the ferrule assembly, there is no relative movement between the ferrule and the jacket. This eliminates micro bends and other undesirable effects mentioned above.

Accordingly, one aspect of the present invention is a field installable connector in which the jacket is anchored essentially to the clamping mechanism. In a preferred embodiment, the field-installable optical connector comprises: (a) a housing having a front and back orientation; (b) a rear body attached to the back of the connector housing; (c) a ferrule assembly disposed in the connector housing, the ferrule assembly comprising at least a ferrule adapted for receiving a fiber and a clamping mechanism to the rear of the ferrule to clamp the fiber in its actuated state; (d) an actuator operatively connected to the clamping assembly to actuate it and having an exposed portion extending in back of the rear body, the exposed portion adapted to be inserted within a cable jacket to secure the cable jacket to the exposed portion, wherein the actuator and the ferrule assembly move as one unit once the clamping mechanism is actuated by the actuator to secure a fiber therein; (e) a resilient member disposed between the ferrule and the rear body to urge the ferrule assembly forward.

BRIEF DESCRIPTION OF DRAWINGS

FIG. 1b shows a traditional connector compared to the connector of FIG. 1a.

FIG. 2 shows an exploded view of the connector of FIG. 1a.

DETAILED DESCRIPTION

Figure 1A:
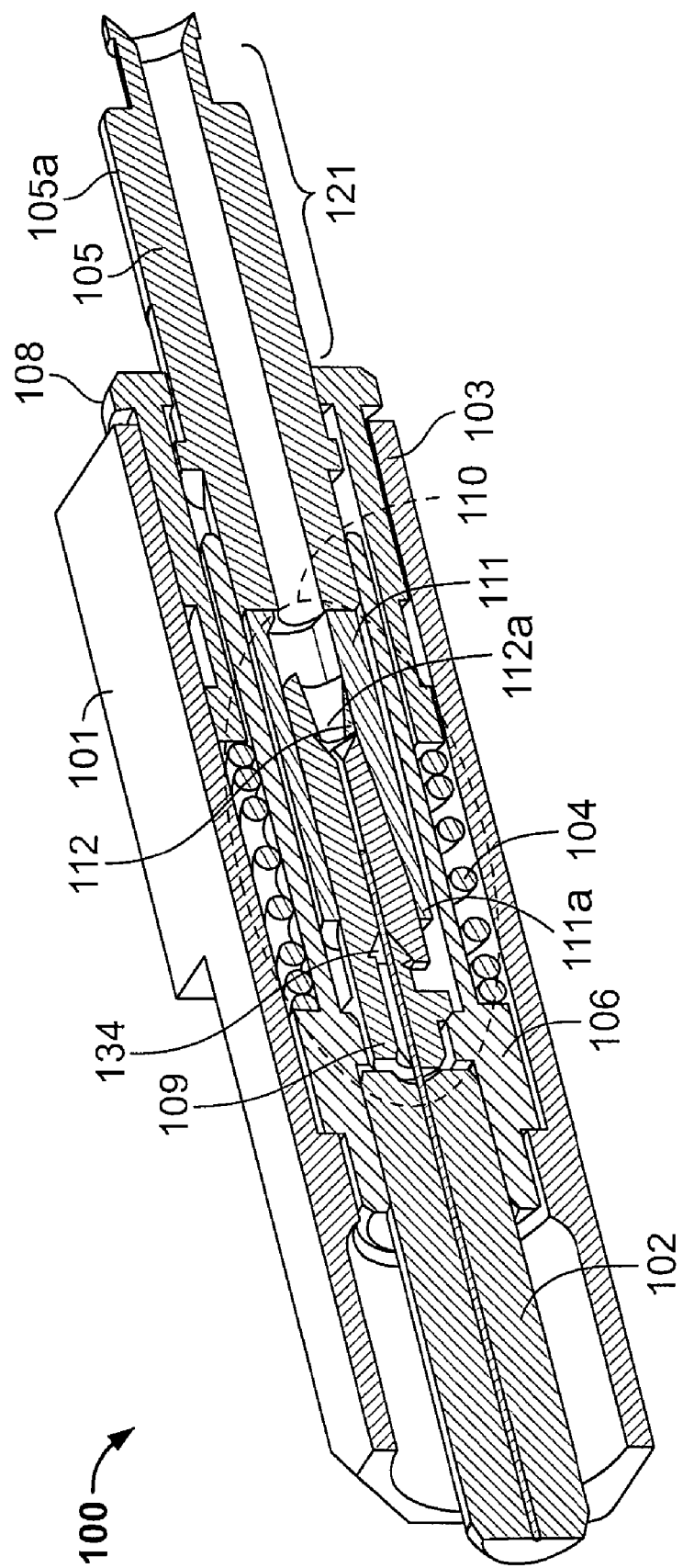
FIG. 1a shows a preferred embodiment of the present invention.

Referring to FIG. 1a, a preferred embodiment of the field installable connector 100 is shown. Specifically, the connector 100 comprises: (a) a housing 101 having a front and back orientation; (b) a rear body 108 attached to the back of the connector housing; (c) a ferrule assembly 110 disposed in the connector housing 101, the ferrule assembly 110 comprising at least a ferrule 102 adapted for receiving a fiber (not shown), and a clamping mechanism 103 disposed to the rear of the ferrule; (d) an actuator 105 operatively connected to the clamping mechanism 103, the actuator having an exposed portion 121 extending rearward of the rear body, the exposed portion 121 being adapted to be inserted within a cable jacket to secure the cable jacket thereto, wherein the actuator 105 and the ferrule assembly 110 move as one unit once the clamping mechanism is actuated by the actuator to secure a fiber therein; (e) a resilient member 104 disposed between the ferrule and the rear body to urge the ferrule assembly forward.

Figure 1B:
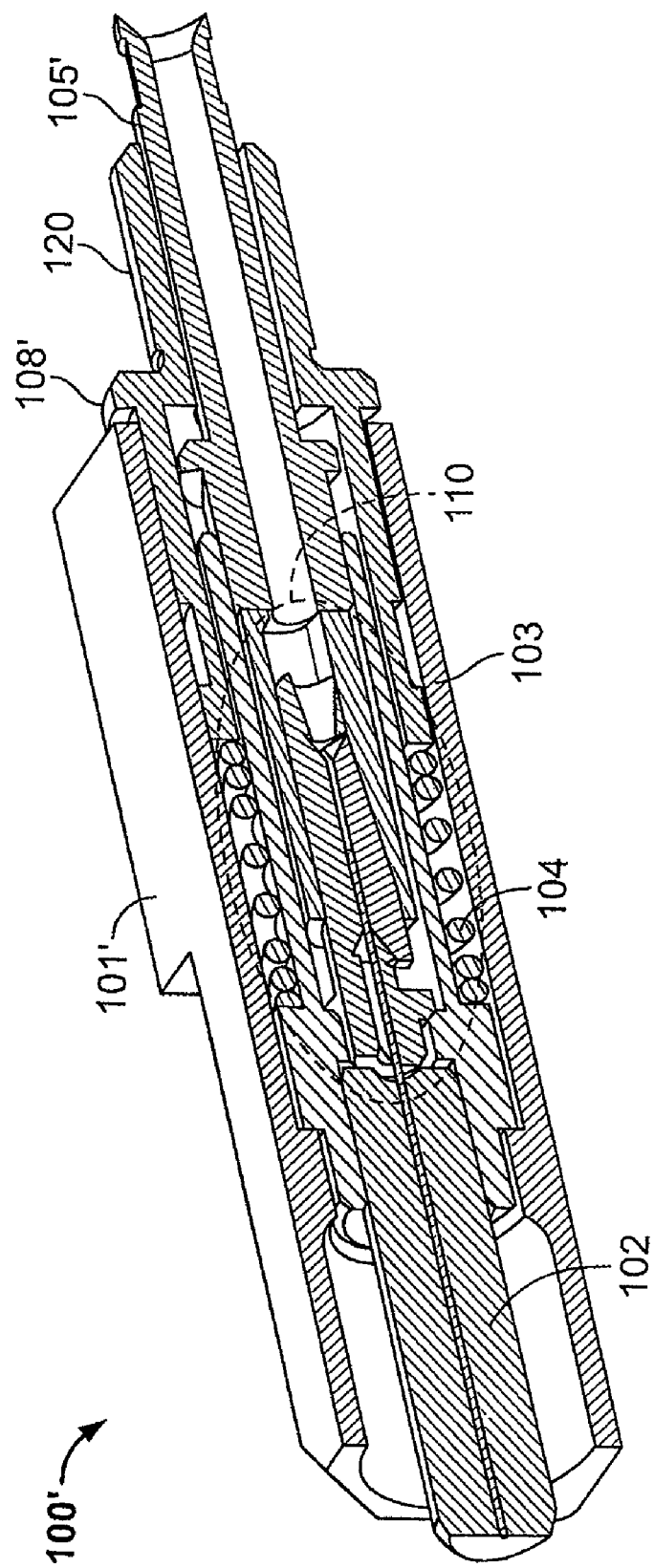

Referring to FIG. 1b, a traditional SC connector 100' is shown for comparative purposes with respect to the connector 100 shown in FIG. 1a. It should be apparent that many of the components used in the traditional connector 100' are the same as those shown in the connector 100 of the present invention. For example, the ferrule 102, clamping mechanism 103, spring 104 and housing 101 are the same. The commonality between the connector 100 and the conventional pull-proof connector 100' is advantageous from the standpoint of minimizing the number of different parts required for a family of connectors.

The difference between the connectors lies in the termination of the jacket to the connector. First, connector 100' is secured to the jacket at its rear body 108', which is fixed to the housing 101. Therefore, any loads on the rear body 108' are transferred to the housing 101. On the other hand, with the connector 100 of the present invention, the jacket is secured to the back end exposed portion 121 of the actuator 105. Because the actuator is secured to the ferrule assembly 110, any movement of the ferrule assembly 110 results in movement of the actuator 105. Consequently, when a fiber is terminated in the ferrule assembly, there is no relative movement between the ferrule and the jacket—the two move as one. This eliminates micro bends and other undesirable effects mentioned above.

To facilitate the attachment of the jacket fiber to the actuator 105, the conventional actuator 105' needs to be modified. As shown, the rear body 108' of the conventional connector 100' has a purchase point 120 for connection to the jacket of the fiber and possibly the strength members of the fiber as well in certain embodiments. The rear body 108 in FIG. 1a, however, does not have a purchase point 120. Rather, it ends essentially at the back of the housing 101, thereby exposing the exposed portion 121 of the actuator 105 and enabling it to be used instead as a purchase point for the jacket.

Preferably, the exposed portion 121 is modified in one or more ways to male it suitable for attachment to the cable's jacket. For example, its wall may be thicker than that of actuator 105' in FIG. 1b. A more robust actuator 105 is preferable to handle the tensile and lateral loads that are likely to be imparted by the jacket (not shown) on the connector. Furthermore, by increasing its thickness to that of the rear body 108', the same crimp eyelet (not shown) used to secure the jacket to the rear body 108' of connector 100' can be used to secure the jacket to the actuator 105 of connector 100. The exposed portion 121 should also have sufficient length (or area) to enable a crimp 202 (see FIG. 2) to secure the jacket and possibly strength members thereto. Another feature of the actuator 105 of the present invention is its textured surface 105a (see also FIG. 2). Specifically, unlike the conventional actuator 105', which was essentially internal to the connector and was not attached to anything at its back end, the actuator 105 needs to attach to the jacket of a cable. To this end, it is preferable to provide a textured surface 105a to enhance the grip with the strength members and the jacket of the optical cable. Previously, the rear body 108' had a textured surface 120 to perform this function. Therefore, the actuator 105 of connector 100 differs from that of connector 100' in a number of ways including, for example, being more robust, having a longer exposed portion 121 revealed for use as a purchase point for the cable jacket, and having a textured surface 105a to enhance its connection to the jacket of the optical cable.

Figure 2:
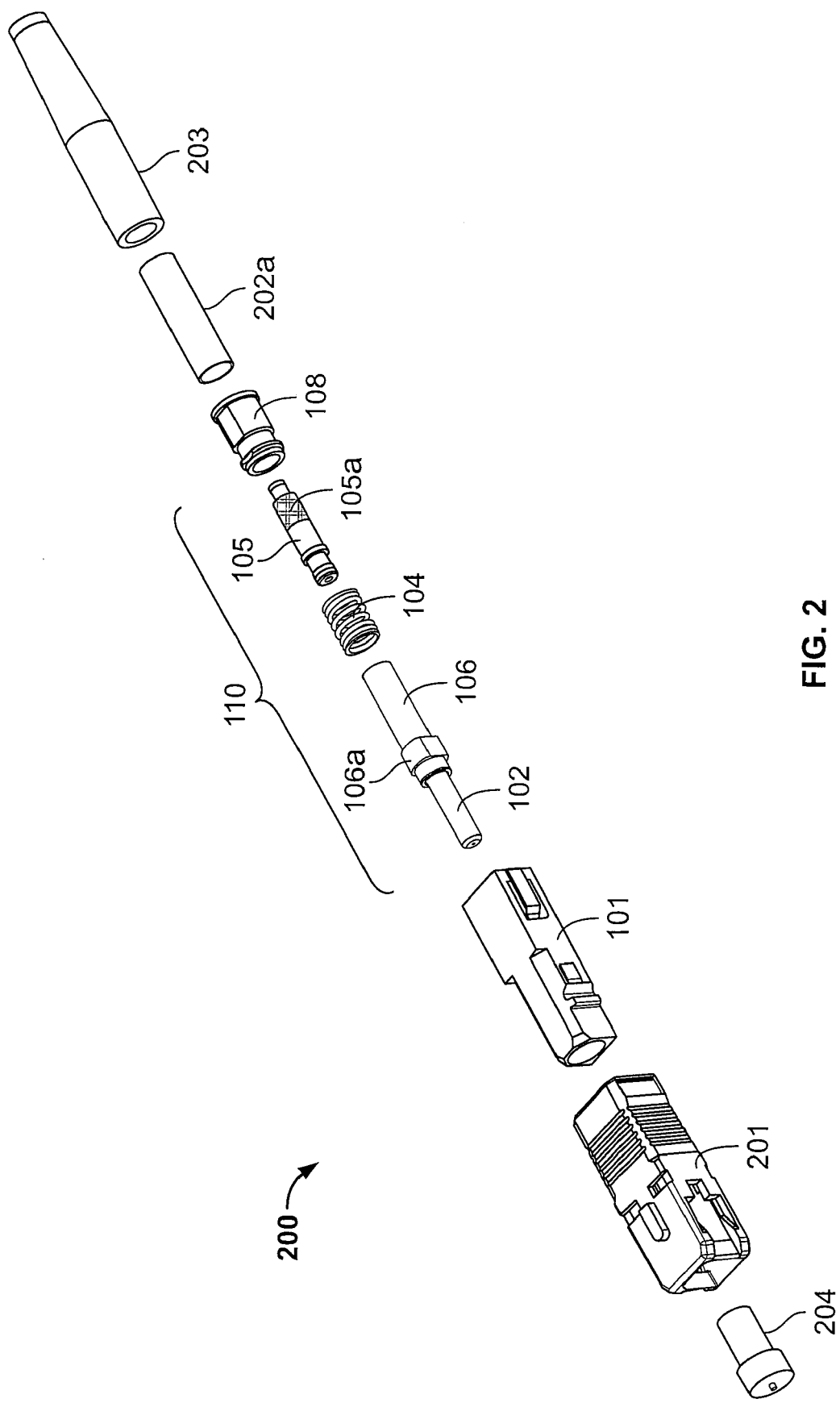

Referring to FIG. 2, an exploded view of the embodiment of FIG. 1a is shown. As mentioned above, this is an SC connector which is a well known connector. Connector 200 comprises an outer housing 201 in which the housing 101, as described with respect to FIG. 1a, is disposed. Contained within housing 101 is the ferrule assembly 110. The ferrule assembly comprises the ferrule 102, a ferrule holder 106, the clamping mechanism within the ferrule holder 106, and the actuator 105 extending rearwardly from the ferrule holder 106. The rear body 108 is snapped or otherwise attached to the back of the housing 101. The spring 104 is configured to urge against a collar portion 106a of the ferrule holder 106 and against the rear body 108 to urge the ferrule assembly 210 forward.

A crimp eyelet 202, which, in this embodiment, also includes a shrink material 202a, is disposed over the actuator textured surface 105a after the jacket and possibly the strength members are terminated to it. This is a common and well known configuration.

Finally, boot 203 is inserted over the crimp eyelet 202 to protect and control the bending of the optical fiber exiting the connector 200. When the connector 200 is not mated to a mating structure, it may be preferable to cover the ferrule 102 with the ferrule covered 204.

Figure 3:
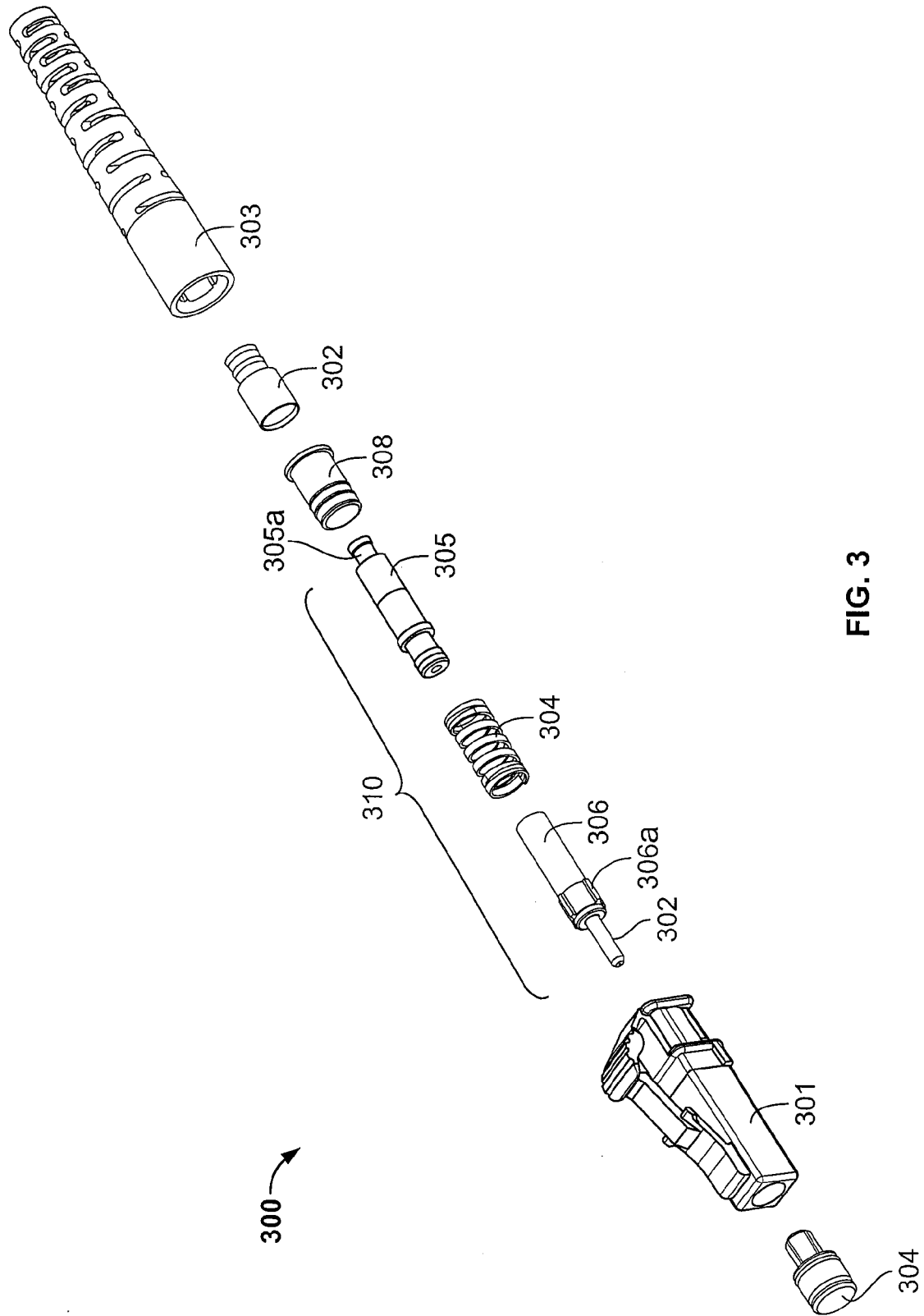
FIG. 3 shows an alternative embodiment of the connector of the present invention.
Figure 4:
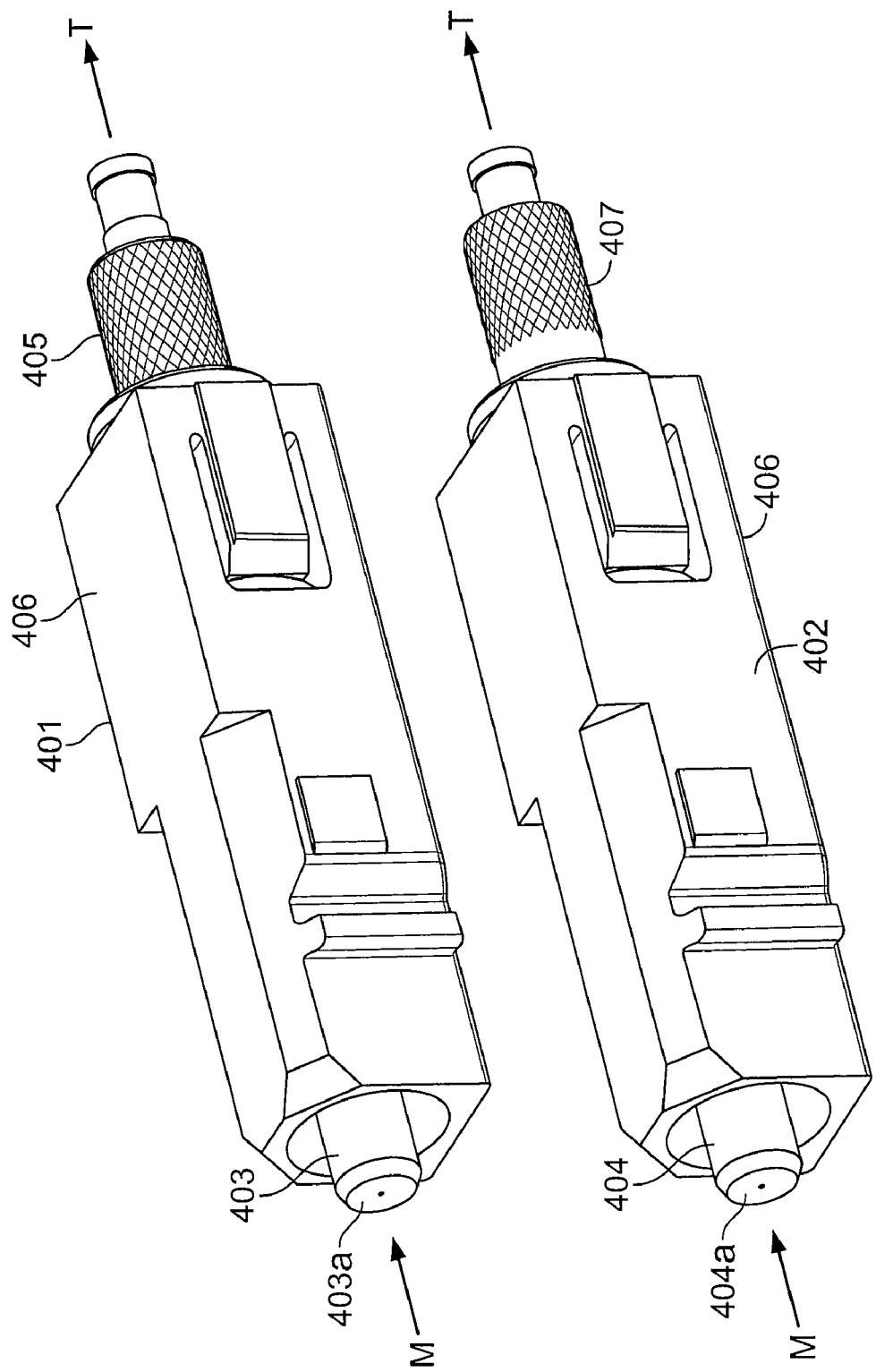
FIG. 4 shows the comparison of prior art pull-proof and non pull-proof SC connectors.
Figure 5:
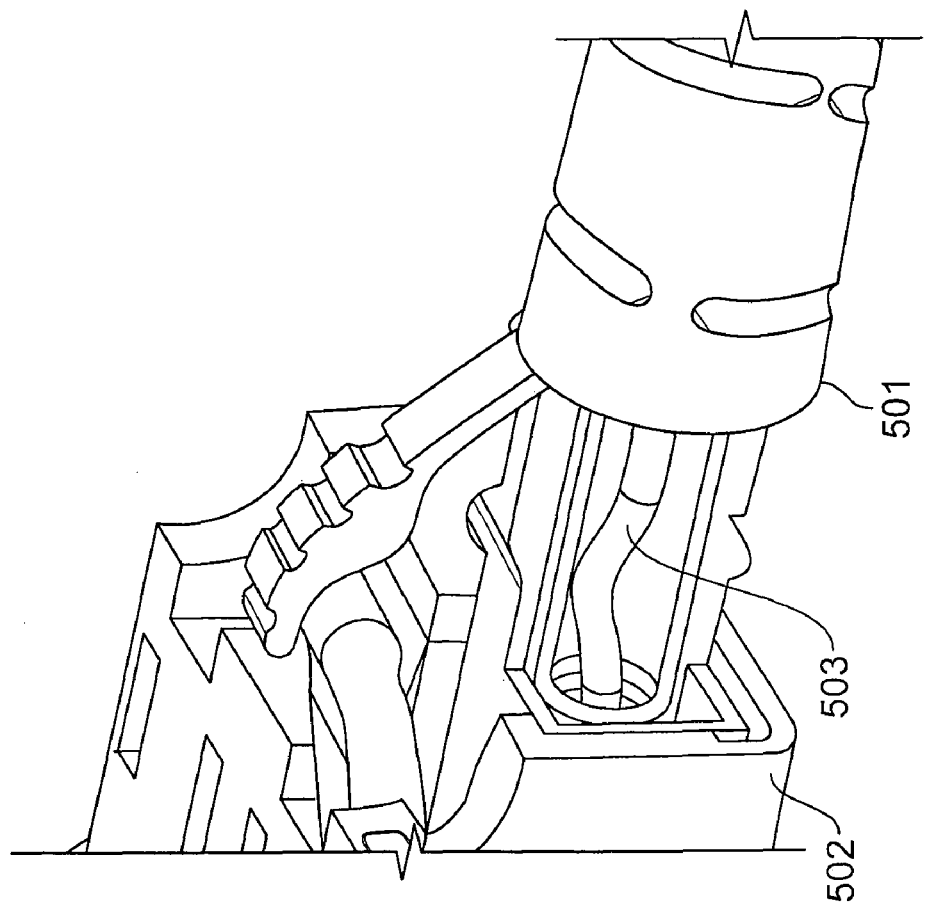
FIG. 5 illustrates the detrimental effects of micro bending when pull-proof connector is terminated to a tight jacked cable.

Referring to FIG. 3, an LC embodiment of the present invention is shown. Like the SC connector, the LC connector is well known so its details will not be address specifically herein. Connector 300 comprises an outer housing 301 which is configured to meet the LC connector standards. Housing 301 contains the ferrule assembly 310. Ferrule assembly 310 comprises a ferrule 302, a ferrule holder 306, a clamping mechanism (not shown) within the ferrule holder, and an actuator 305 extending from the ferrule holder 306.

The clamping mechanism is similar to clamping mechanism 103 disclosed in FIG. 1a, and disclosed, for example, in U.S. Published Patent application No. 20060002662, which is hereby incorporated by reference. The rear body 308 is snapped or otherwise attached to the back of the housing 301. A spring 304 is disposed around the ferrule assembly 310 is configured to contact collar 306a of the ferrule holder 306 and the rear body 308 such that ferrule assembly 310 is urged forward with respect to housing 301.

A crimp 302 is configured to slide over the actuator 305, in particular, the textured portion of 305a, to secure the jacket and strength members (if any) of an optical cable to the actuator 305. As mentioned above with respect to FIG. 2, this is a well known process. Finally, a boot 303 is configured to slide over the crimp 302 and to protect and control bending of the optical cable extending from the connector 300.

In broad terms though, the clamping mechanism functions to secure a terminating fiber (i.e., the cable fiber) in the connector such that the fiber cannot be pulled from the connector under ordinary force when the mechanism is in its actuated state. Generally, the clamping mechanism 103 has a top and bottom and front and back orientation, at least one optical axis, and a pre-actuated state in which the terminating fiber is not secured to the clamping mechanism and a post-actuated state in which the terminating fiber is secured to the clamping mechanism. When actuated, the clamping mechanism imparts a radial force upon the fiber to essentially hold it to the connector. Referring back to FIG. 1a, the clamping mechanism 103 may be any mechanism that can be actuated using a rearwardly extending actuator. Such a clamping mechanism may be axially or rotationally actuated. In this embodiment, the clamping mechanism is axially actuated and is disposed behind the ferrule and is enclosed in the ferrule holder 106. It comprises a platform 109 disposed in the ferrule holder 106 and being fixed therein both radially and axially. The platform 109 defines a fiber-receiving channel 134 along the optical axis 117 to receive at least one fiber. At least a portion of the fiber-receiving channel 134 is accessible from the bottom. The clamping mechanism 103 also comprises first and second cam members 111, 112. The first cam member 111 has a first cam surface 111a, and is disposed in the ferrule holder 106 above and adjacent to the fiber-receiving channel 134. The second cam member 112, which is preferably a sleeve, is disposed in the ferrule holder 106 and is axially slideable therein. The second cam member 112 has a second cam surface 112a adjacent the first cam surface 111a and configured such that, upon forward motion of the second cam member 112 relative to the first cam member 111, the first cam member 111 is urged upward (in the origination of FIG. 1a) as a result of a camming action between the first and second cam surfaces, 111a, 112b. This clamping mechanism is well known and is described, for example, in U.S. Pat. No. 7,331,719, which is hereby incorporated by reference. Accordingly, details of this clamping mechanism will not be addressed herein.

The clamping mechanism also comprises or is otherwise associated with the actuator 105, the front end of which is disposed slidably within the holder 106 behind and adjacent to the second first cam member 112. The actuator 105 is configured, such that, when moved forward, it forces the second first cam member 112 forward relative to the first cam member 111. Alternatively, the actuator could be configured to push the first member forward relative to the housing.

Thus, the clamping mechanism of the present invention provides for a relatively simple-to-manufacture connector system which is robust and tolerant of variations in terminating styles and techniques in the field. Optionally, the clamping mechanism can also function to align and hold the terminating fiber to a fiber stub, which is pre-terminated and polished in the ferrule as is known.

Therefore, the present invention provides a field-installable connector for tight-jacketed cable that exploits a know fiber clamping mechanism such the mechanism's actuator is used not only to actuate the mechanism, but also to secure the cable jacket to the connector such that the ferrule and the cable jacket move as one. Therefore, when a mating force is applied to the ferrule end face, the entire assembly moves backwards along with the fiber, therefore eliminating the occurrence of micro bends and fractures between the ferrule and the anchor point of the optical cable. Still other benefits and application will be obvious to one of skill in the art in light of this disclosure.

What is claimed is:

1. A field-installable optical connector for terminating tight-jacketed optical cable, said connector comprising:
   a tight-jacketed optical cable comprising at least one fiber, a buffer around said fiber, strength members around said buffer, and a jacket tightly containing said fiber, buffer and strength members such that said buffer cannot move within said jacket;
   a connector housing having a front and back orientation;
   a rear body attached to the back of said connector housing;
   a ferrule assembly disposed in said connector housing, said ferrule assembly comprising at least a ferrule containing said fiber, and a clamping mechanism to the rear of said ferrule for securing said fiber;
   an actuator operatively connected to said clamping mechanism to actuate said clamping mechanism, said actuator having an exposed portion extending rearward from said rear body, said exposed portion adapted to be inserted within a jacket of said cable to secure said jacket to said exposed portion, wherein said actuator and said ferrule assembly move as one unit once said clamping mechanism is actuated by said actuator to secure said fiber therein;
   a crimp crimping at least one of said strength members or said jacket to said exposed portion; and
   a resilient member disposed between said ferrule and said rear body to urge said ferrule assembly forward.

2. The connector of claim 1, wherein at least a portion of said exposed portion of said actuator has a textured surface to enhance grip.

3. The connector of claim 1, wherein said actuator extends beyond said connector housing by at least the length of said crimp.

4. The connector of claim 1, wherein said connector housing corresponds to a small form factor.

5. The connector of claim 4, wherein said connector housing is configured as an LC type connector.

6. The connector of claim 5, wherein said connector housing is a single, integrally molded piece.

7. The connector of claim 1, wherein said connector housing is configured as a SC type connector.

8. The connector of claim 1, further comprising a fiber stub in said ferrule.

9. The connector of claim 1, wherein said clamping mechanism comprising at least a platform defining a fiber-receiving channel for receiving said fiber, a first member adjacent to the fiber-receiving channel and having at least a first cam surface, and a second member having a second cam surface, said first and second cam surfaces cooperating such that relative movement between said first and second members causes said first member to move toward said fiber-receiving channel.

10. The connector of claim 9, wherein said actuator is a plunger, said plunger being operatively connected to said second member to cause said second member to move relative said first member upon axial movement of said plunger.

11. The connector of claim 10, wherein said platform has an essentially planar substrate surface in which said fiber-receiving channel is defined.

* * * * *